United States Patent
Deshpande et al.

(10) Patent No.: US 12,492,738 B2
(45) Date of Patent: Dec. 9, 2025

(54) ROTATIONAL MOTION TRANSMISSION MECHANISM FOR NON-PARALLEL AXES

(71) Applicant: RAYCURA MEDICAL TECHNOLOGIES PRIVATE LIMITED, Nagpur (IN)

(72) Inventors: Rohan Milind Deshpande, Nagpur (IN); Ayush Sanjay Gaikwad, Chandkapur (IN)

(73) Assignee: RAYCURA MEDICAL TECHNOLOGIES PRIVATE LIMITED (IN)

( * ) Notice: Subject to any disclaimer, the term of this patent is extended or adjusted under 35 U.S.C. 154(b) by 0 days.

(21) Appl. No.: 18/568,580

(22) PCT Filed: Jun. 5, 2022

(86) PCT No.: PCT/IN2022/050525
§ 371 (c)(1),
(2) Date: Dec. 8, 2023

(87) PCT Pub. No.: WO2022/259264
PCT Pub. Date: Dec. 15, 2022

(65) Prior Publication Data
US 2024/0280163 A1    Aug. 22, 2024

(30) Foreign Application Priority Data
Jun. 10, 2021 (IN) .............................. 202121025758

(51) Int. Cl.
*F16H 1/16* (2006.01)

(52) U.S. Cl.
CPC ...................................... *F16H 1/16* (2013.01)

(58) Field of Classification Search
CPC ... F16H 1/16; F16H 1/24; F16H 1/145; F16H 2001/322
See application file for complete search history.

(56) References Cited

U.S. PATENT DOCUMENTS 855,937 A     6/1907  Collier
2,261,901 A *  11/1941 Erdman .................. F16H 1/006
                                                  74/416

(Continued)

FOREIGN PATENT DOCUMENTS

CN         109578520 A      4/2019

OTHER PUBLICATIONS

International Search Report dated Sep. 6, 2022 issued in PCT/IN2022/050525.

(Continued)

*Primary Examiner* — Zakaria Elahmadi

(57) ABSTRACT

The rotational motion transmission unit/mechanism for non-parallel axes (100) comprises of at least one driver (110) and a driven (120). The driver (110) has at least one guide (113) on it that curls around a driver axis (111) with an axial lead. The driven (120) rotates around its axis (121) that is non-parallel to driver axis (111) and has at least one follower (122) that is engage able with at least one guide (113) of the driver (110). When the driver (110) rotates around its axis (111), the guide (113) leads the engaged follower (122) of the driven (120) in an arc resulting in rotation of the driven (120). The driver (110) and the driven (120) can rotate continuously in synchronization.

7 Claims, 10 Drawing Sheets

(56) References Cited

U.S. PATENT DOCUMENTS

| | | | | |
|---|---|---|---|---|
| RE22,555 E | * | 10/1944 | Brooks | F16D 3/18 464/157 |
| 2,407,155 A | * | 9/1946 | Holmes | F16H 1/006 74/461 |
| 2,482,415 A | * | 9/1949 | Hilton | F16D 3/18 74/380 |
| 2,496,871 A | * | 2/1950 | Griffin | F16D 3/18 74/380 |
| 2,696,125 A | | 12/1954 | Saari | |
| 2,776,578 A | | 1/1957 | Saari | |
| 2,908,187 A | | 10/1959 | Saari | |
| 3,468,179 A | * | 9/1969 | Sedgwick | F16H 1/163 74/425 |
| 4,109,548 A | * | 8/1978 | Shinohara | F16H 53/08 74/569 |
| 4,602,527 A | * | 7/1986 | Tamiya | F16H 48/08 74/415 |
| 4,917,511 A | * | 4/1990 | Katsube | F16C 35/077 384/585 |
| 5,197,354 A | * | 3/1993 | Mohr | F16H 27/08 74/435 |
| 5,497,671 A | * | 3/1996 | Rourke | F16H 1/12 74/415 |
| 7,434,489 B1 | * | 10/2008 | Scranton | B62M 17/00 280/238 |
| 2008/0210103 A1 | * | 9/2008 | Wan | F26B 5/08 34/58 |
| 2009/0048051 A1 | * | 2/2009 | Koleoglou | F16H 55/10 475/183 |
| 2015/0128734 A1 | * | 5/2015 | Hong | F16H 55/0813 74/98 |

OTHER PUBLICATIONS

Nguyen Duc Thang; "1700 Animated Mechanical Mechanisms", Aug. 17, 2017; Available at https://cpn-usw2.wpmucdn.com/sites.gatech.edu/dist/2/334/files/2017/09/1700-Animated-Linkages.pdf. p. 1, p. 9 (Rzeppa Joint); p. 10 (Birfield joint).

Written Opinion dated Sep. 6, 2022 issued in PCT/IN2022/050525.

* cited by examiner

ROTATIONAL MOTION TRANSMISSION MECHANISM FOR NON-PARALLEL AXES

FIELD OF INVENTION

The present invention in general relates to the field of mechanical engineering and more particularly to a rotational motion transmission mechanism for non-parallel axes.

BACKGROUND OF THE INVENTION

Many mechanical power transmission applications and actuators require angular rotation motion transmission. Constant velocity joints, universal joint, bevel gears, skew gears, and worm and worm wheel are commonly used, each having its advantages and shortcomings. Like universal and CV joints cannot be used for torque or speed multiplication, bevel gears don't transmit much power compared to its size, worm wheel has a lot of distance between the driver and driven axes, and skew gears and worm and worm wheel can only do torque multiplication that too with high torque multiplication ratios. Although various attempts are made to improvise these angular motion transmission systems, few of them are discussed:

U.S. Pat. No. 2,908,187 discloses the reduction gearing unit novel skew axis reduction gearing unit including a plurality of concentric gear sections respectively driven by a plurality of worms, which gear sections and worms are constructed and arranged with respect to each other so as to provide a highly compact unit having a relatively high reduction ratio.

U.S. Pat. No. 2,776,578 discloses the skew axis gearing and to a method of making such gearing. Described that skew axis gears having teeth of such form that the entire side surfaces of the teeth of each member contact with and transfer power to the entire side Surfaces or the teeth or thread of the other member. Also described that when a hob corresponding to the worm member of the skew axis gearing is used to cut teeth on the gear, the formation of fillets and undercuts can be avoided only by making the form of the thread such that at each point of its outer surface the thread extends in the direction of the relative motion between that point and the point of the gear blank with which it comes in contact.

U.S. Pat. No. 2,696,125 discloses the speed-reduction gearing. The commonly used type of reduction gearing in which a worm engages teeth on the periphery of a gear requires very accurate positioning of the axes of the gear and the worm and cannot easily be adjusted to regulate back lash after wear. The area of tooth engagement is small so that the gearing must be made large in order to transmit a substantial amount of power. Gearing in which a worm engages teeth on the face of a crown or bevel gear has been proposed, but, in order to obtain sufficient tooth engagement in such gearing to transfer substantial power, it has heretofore been considered necessary to give the worm some peculiar form which makes it difficult and expensive to produce. The reduction gearing which described consists of a conical worm having only a slight taper and having a thread of uniform cross-sectional shape and uniform lead and a bevel gear having teeth with side faces which engage the thread of the worm throughout substantially their entire areas. The gearing, therefore, has a large power transmitting capacity in comparison with its size.

U.S. Pat. No. 855,937 discloses the improved worm-gearing consists in that the teeth of the worm-wheel are formed by balls which are arranged to turn freely in hemispherical recesses in the worm-wheel and are retained in position in any suitable manner, by means of an annular guard interrupted only by the worm, or each ball is retained in its recess by one or more lateral projections on the wheel, these projections being arranged in such positions as to clear the thread or threads of the worm. There may be one, two or more annular series of recesses in the worm-wheel so that each of the ball-teeth will consist of one, two or more balls arranged side by side.

Worm wheels in which the teeth consist of two or more balls arranged side by side are not however applicable to globoidal worms but only to worms in which the thread or threads lie in a cylindrical surface.

OBJECT OF THE INVENTION

The primary object of present invention is to provide a rotational motion and power transmission mechanism for non-parallel axes.

Another object of present invention is to provide an efficient angular power transmission mechanism, with better stress distribution in parts giving better torque transmission capability for its size.

Yet another object of present invention is to provide rotational motion and power transmission mechanism having intersecting driving and driven axes or non-intersecting driving and driven axes having minimal distance between both compared to worm and worm wheel gearing.

Yet another object of present invention is to provide rotational motion and power transmission mechanism for non-parallel axes which can work in clockwise and anti-clockwise direction.

Yet another object of present invention is to provide rotational motion and power transmission mechanism for non-parallel axes which can be made back drivable.

Yet another object of present invention is to provide rotational motion and power transmission mechanism for non-parallel axes which can be designed for torque multiplication, speed multiplication, or 1:1 speed ratio.

Other objects, features and advantages will become apparent from detail description and appended claims to those skilled in art.

SUMMARY OF THE INVENTION

The present invention provides a rotational motion transmission mechanism for non-parallel axes. The disclosed mechanism enables efficient angular power transmission, with better stress distribution in parts giving better power and torque transmission capability to its size.

An embodiment of the present invention discloses a rotational motion transmission unit for non-parallel axes rotation. The rotational motion transmission unit, comprises at least one driver comprising at least one guide, said guide curls around a driver axis with an axial lead; and at least one driven comprising at least one follower arranged around a driven axis, wherein the driver axis of rotation is non-parallel to the driven axis of rotation; at least one contact patch of the at least one follower engaging with at least one guide is radially inward to the driven; the driver while rotating around its axis arranged to rotate the driven around the driven axis by the guide leading the followers engaged with it in an arc; wherein a first distance between the driver axis and the driven axis is less than a second distance between the driven axis and engaging point of guide and follower proximate to driven axis.

In one embodiment of the present invention, the at least one guide and the at least one follower are engaged with each other.

In other embodiments of the present invention, the at least one guide and the at least one follower are configured to disengage and re-engage with each other in one of an arrangement, comprising: the driver axis and the driven axis are non-intersecting; the guide leads the followers less than 180 degrees around the driven axis; and the followers are retractable.

In the embodiments of the present invention, the followers are monolithic or assembled to the driven.

In the embodiments of the present invention, the transmission unit is configurable for speed multiplication, 1:1 speed ratio, and torque multiplication.

In the embodiments of the present invention, the transmission unit is reversible, wherein both the driver and the driven are ingrained to rotate clockwise and anticlockwise.

In another embodiment of the present invention, the transmission unit is configurable for back drivability.

In the embodiments of the present invention, the driver and the driven are devised to rotate continuously in synchronization.

BRIEF DESCRIPTION OF DRAWINGS

This invention is described by way of example with reference to the following drawings. These drawings being referred herein are for the purpose of illustrating preferred embodiments of the invention only, and not for the purpose of limiting the same.

DETAILED DESCRIPTION OF THE DRAWINGS

Figure 1:
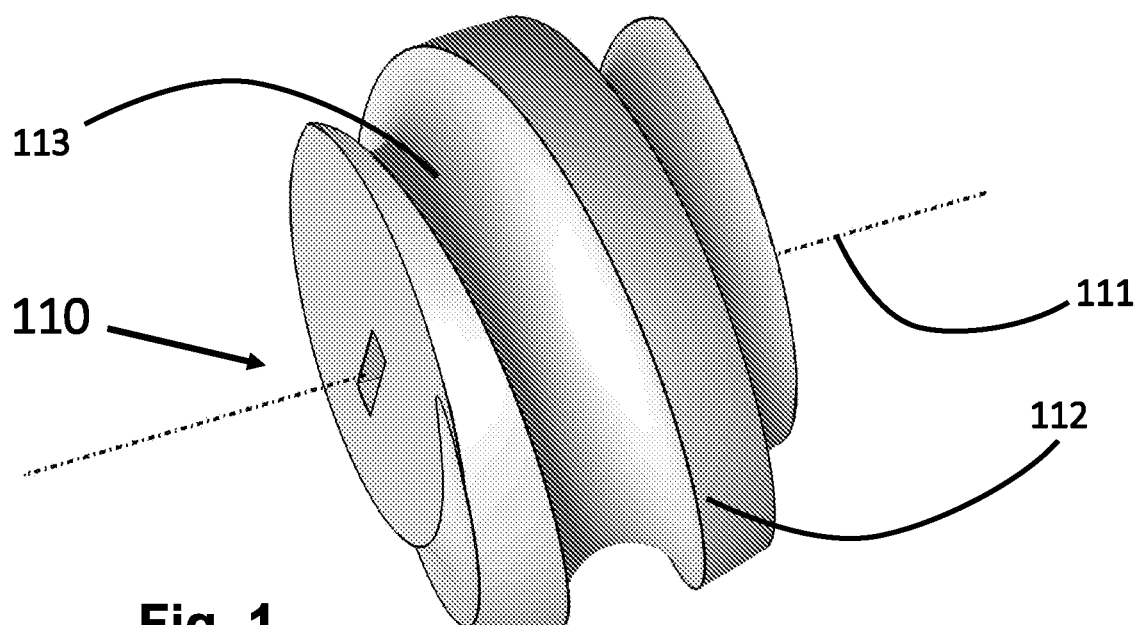
FIG. 1 shows a driver (110) of the first embodiment of a rotational motion transmission unit (100), wherein a guide (113) is designed for torque multiplication.

The present invention is described hereinafter by various embodiments with reference to the accompanying drawings, wherein reference numerals used in the accompanying drawings correspond to the like elements throughout the description. This invention may, however, be embodied in many different forms and should not be construed as limited to the embodiments set forth herein. Rather, the embodiments are provided so that this disclosure will be thorough and complete and will fully convey the scope of the invention to those skilled in the art. In the following description, numeric values and ranges are provided for various aspects of the implementations described. These values and ranges are to be treated as examples only and are not intended to limit the scope of the invention. In addition, a number of materials are identified as suitable for various facets of the implementations. These materials are to be treated as exemplary and are not intended to limit the scope of the invention.

It will be understood by those skilled in the art that the foregoing general description and the following detailed description are exemplary and explanatory of the invention and are not intended to be restrictive thereof.

The terms "comprises", "comprising", or any other variations thereof, are intended to cover a non-exclusive inclusion, Appearances of the phrase "in an embodiment", "in another embodiment" and similar language throughout this specification may, but not necessarily do, all refer to the same embodiment. As used throughout this description, the word "may" is used in a permissive sense (i.e. meaning having the potential to), rather than the mandatory sense, (i.e. meaning must). Further, the words "a" or "an" mean "at least one" and the word "plurality" means "one or more" unless otherwise mentioned. Furthermore, the terminology and phraseology used herein is solely used for descriptive purposes and should not be construed as limiting in scope. The term "rotational motion transmission mechanism" and "rotational motion transmission unit" are used interchangeably throughout the specification.

The systems, methods, and examples provided herein are only illustrative and not intended to be limiting. Some parts and features of parts are described by their role in working of the mechanism/unit, rather than their shape and form. The present invention relating to a rotational motion transmission mechanism for non-parallel axes for driving mechanical systems by providing a new concept that can be understood by way of following embodiments below:

The rotational motion transmission mechanism for non-parallel axes, further referred as rotational motion transmission unit comprises of a driver and a driven. The driver rotates on its axis and has convex outer surface having at least one guide on it. The driven rotates around its axis which is non-parallel to the driver axis, and has followers on it able to mesh with at least one guide of the driver. When the driver rotates around its own axis the guide on it leads the meshed followers of driven in an arc resulting in rotation of driven around driven axis. The driver and driven can rotate continuously in synchronization.

The present invention will now be explained with reference to the drawings:

Embodiment 1

FIG. 1 shows a driver (110) of a first embodiment of the rotational motion transmission unit (100), having an axis of rotation (111). The driver (110) on an outer surface (112) has a guide (113) that curls around the driver axis (111) with an axial lead. The curling radius and pitch of the guide (113) varies throughout length. The guide (113) is made as a groove and is designed for torque multiplication and speed reduction.

Figure 2:
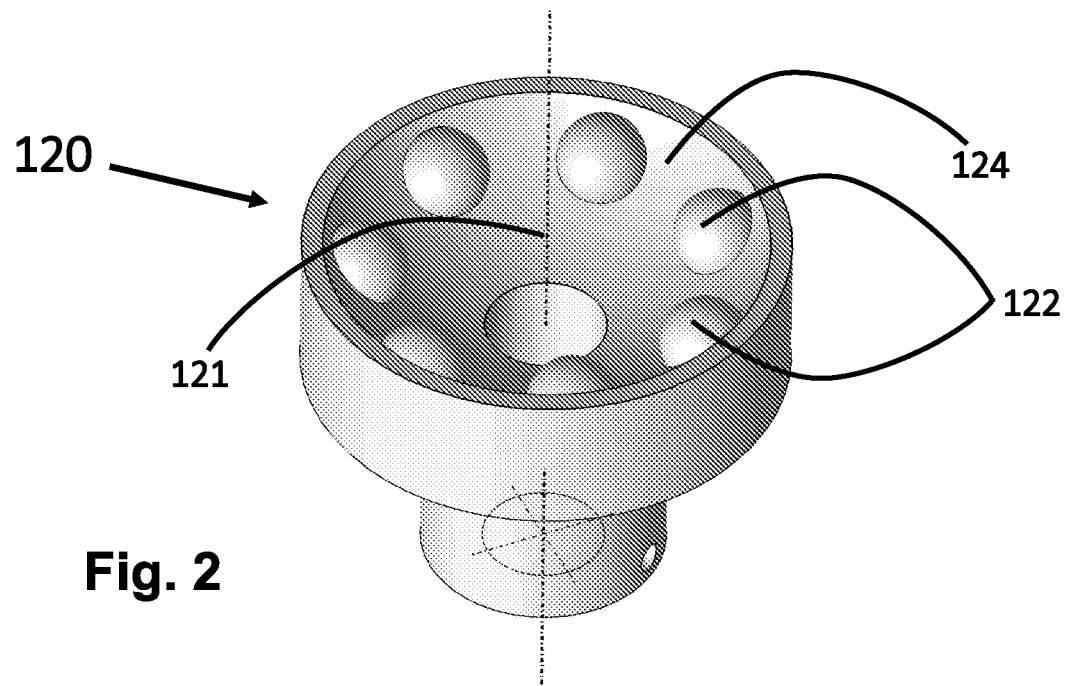
FIG. 2 shows a driven (120) of the first embodiment of the rotational motion transmission unit (100) having followers (122) monolithic with it.

FIG. 2 shows a driven (120) of the first embodiment of the rotational motion transmission unit (100), having an axis of rotation (121). On a radially inner surface (124) of the driven (120) are followers (122) that are monolithic with the driven (120) and are shaped like protruding hemispheres.

Figure 3:
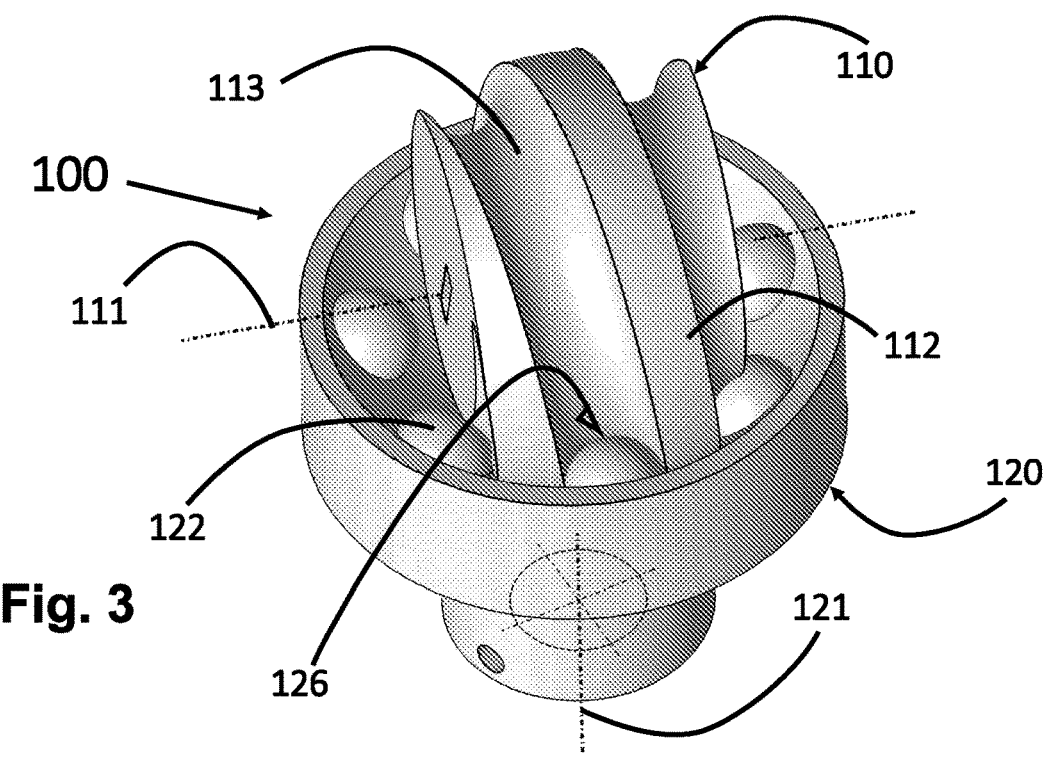
FIG. 3 shows the assembly of the first embodiment of the rotational motion transmission unit (100). The guide (113) engages with the few followers (122) on one side.

FIG. 3 shows the assembly of the first embodiment of the rotational motion transmission unit (100). The guide (113) engages with the few followers (122) on one side. The followers (122) are meant to follow the guide (113) to obtain motion transmission. A contact patch (126) comprises surfaces, edges and vertices of the followers (122) that abuts with the guide (113) for transferring the motion.

Figure 4:
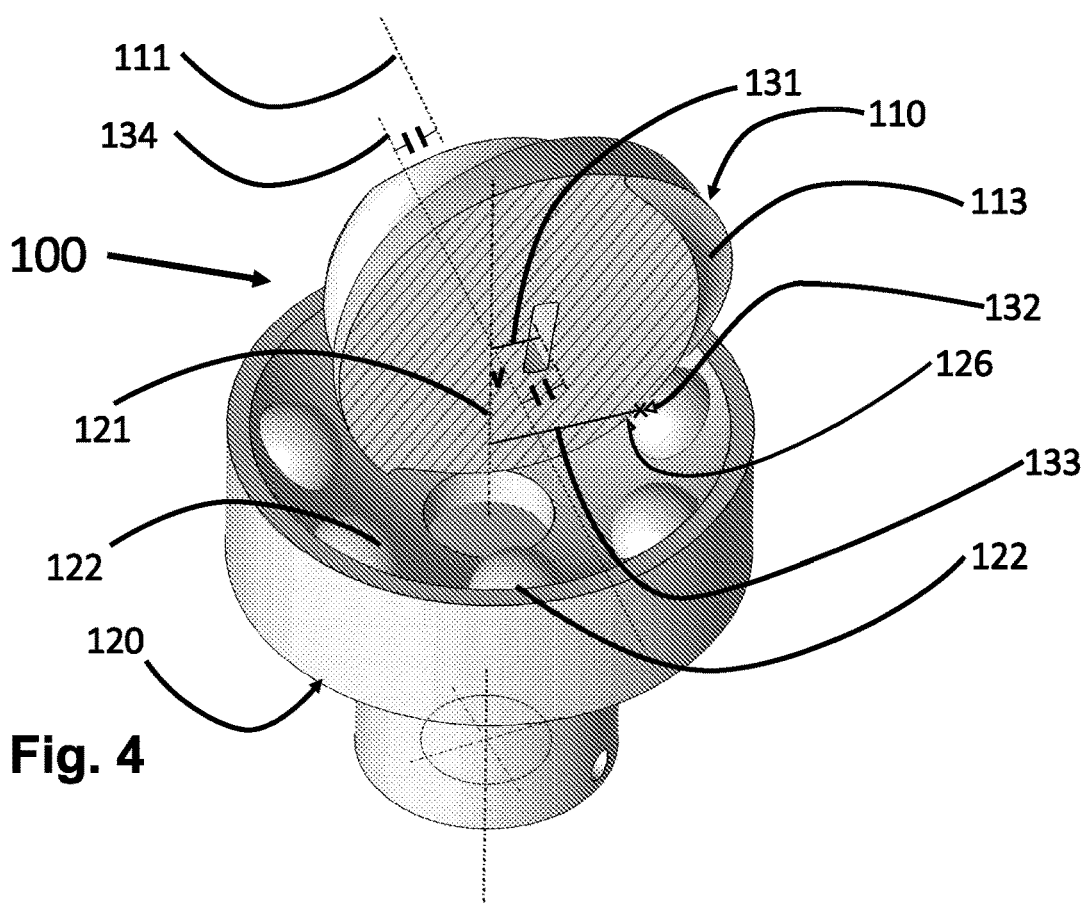
FIG. 4 shows the assembly of the first embodiment of the rotational motion transmission unit (100) with another view and cut section of the driver (110).

FIG. 4 shows the assembly of the first embodiment of the rotational motion transmission unit (100) with another view and cut section of the driver (110). In this embodiment the driver axis (111) and the driven axis (121) are non-intersecting and are at right angle to each other (non-parallel). To indicate the angle of transmission, a segment (134) is drawn parallel to the driver axis (111) that intersects the driven axis (121) and angle between it is indicated with right angle symbol. First distance (131) indicates the minimum straight distance between the axes (111) and (121). The reference (132) is imaginary point on the contact patch (126) of the follower (122) that is nearest/proximate to the driven axis (121). Second distance (133) is minimum straight distance between point (132) and the axis (121). The Distance (131) is less than the distance (133). The contact patch (126) of the followers (122) is radially inward to the driven (120).

Figure 5:
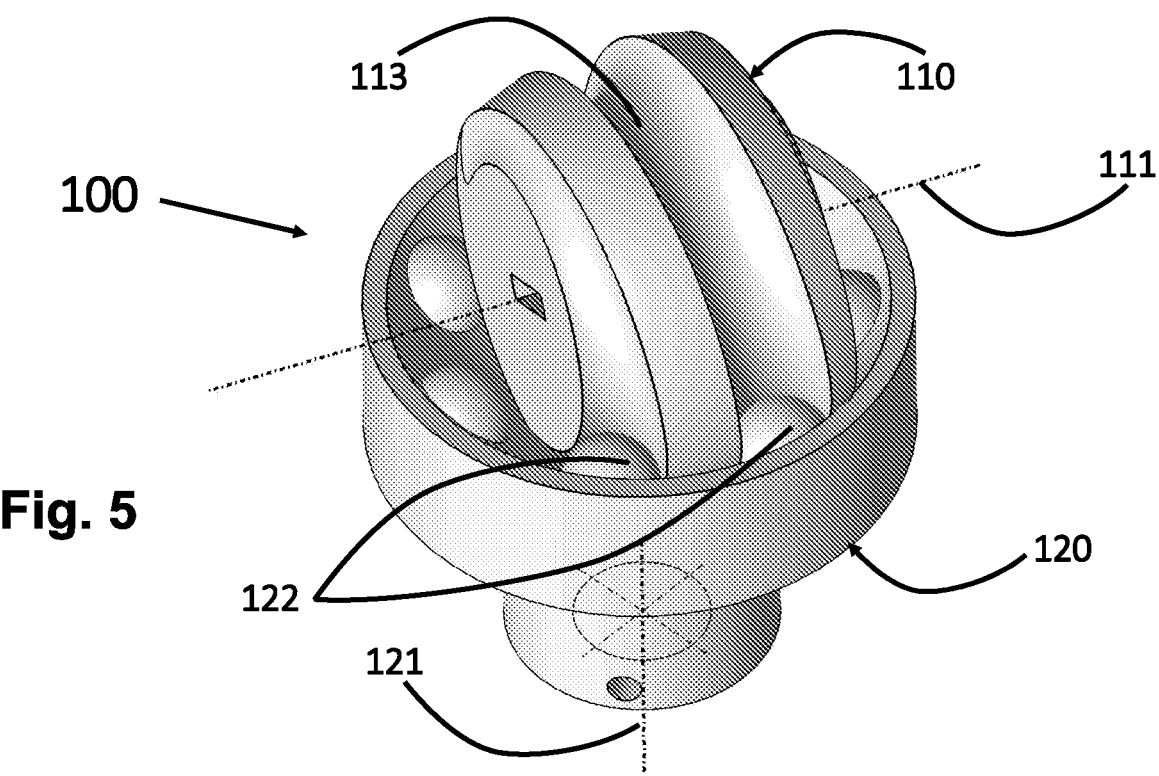
FIG. 5 shows the assembly of the first embodiment of the rotational motion transmission unit (100).

FIG. 5 shows the assembly of the first embodiment of the rotational motion transmission unit (100). When the driver (110) is rotated around its axis (111), the guide (113) leads the engaged followers (122) in an arc resulting in rotation of the driven (120) around the axis (121).

Figure 6:
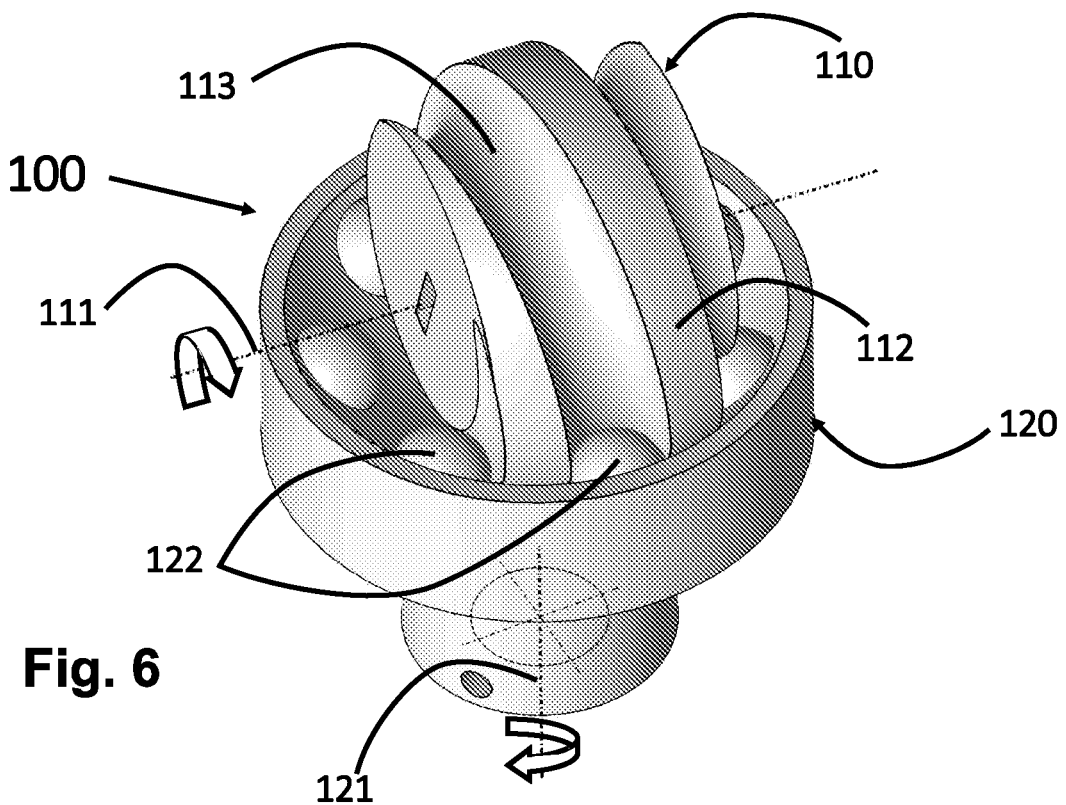
FIG. 6 shows the assembly of the FIG. 5 with rotationally displaced the driven (120) when the driver (110) is rotated.

FIG. 6 shows the assembly of the FIG. 5 with the rotationally displaced driven (120) when the driver (110) is rotated. After getting led in an arc the engaged follower (122) further dis-engages from the guide (113) while the next follower (122) engage with the guide (113) and gets led in the same way. The rotational motion transmission unit of the first embodiment has a velocity ratio of 7:1, where 140-degree rotation of the driver (110) around the axis (111) results in 20-degree rotation of the driven (120) around the axis (121). When the driver (110) rotates fourteen rotations the driven (120) rotates two rotations giving a speed ratio of 7:1. The driver (110) and the driven (120) are continuously rotatable in synchronization.

Figure 7:
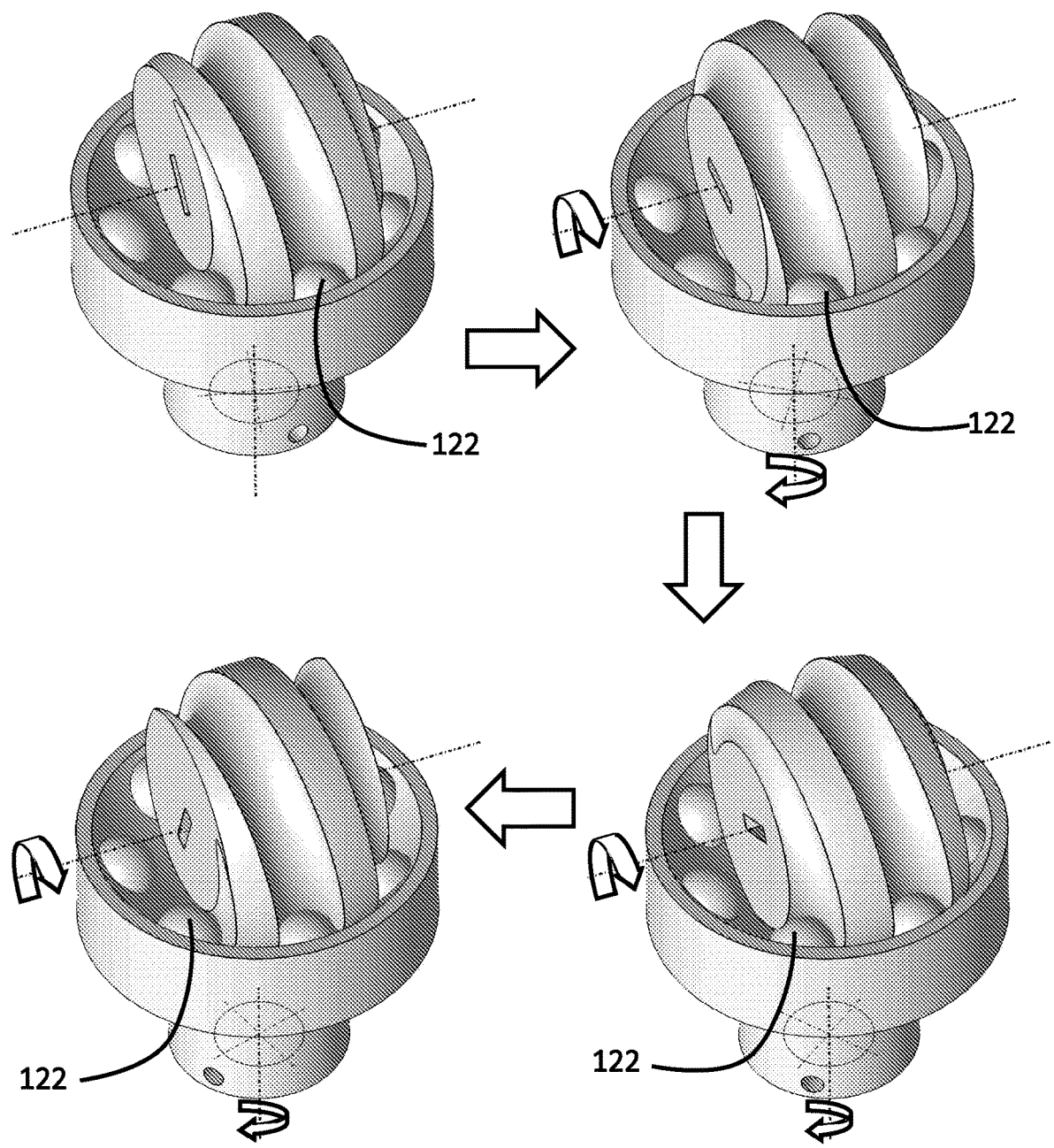
FIG. 7 shows few stages of the rotational motion transmission unit (100) of first embodiment when the driver (110) is rotated around its axis (111).

FIG. 7 shows few stages of the rotational motion transmission unit (100) of first embodiment when the driver (110) is rotated around its axis (111).

Embodiment 2

Figure 8:
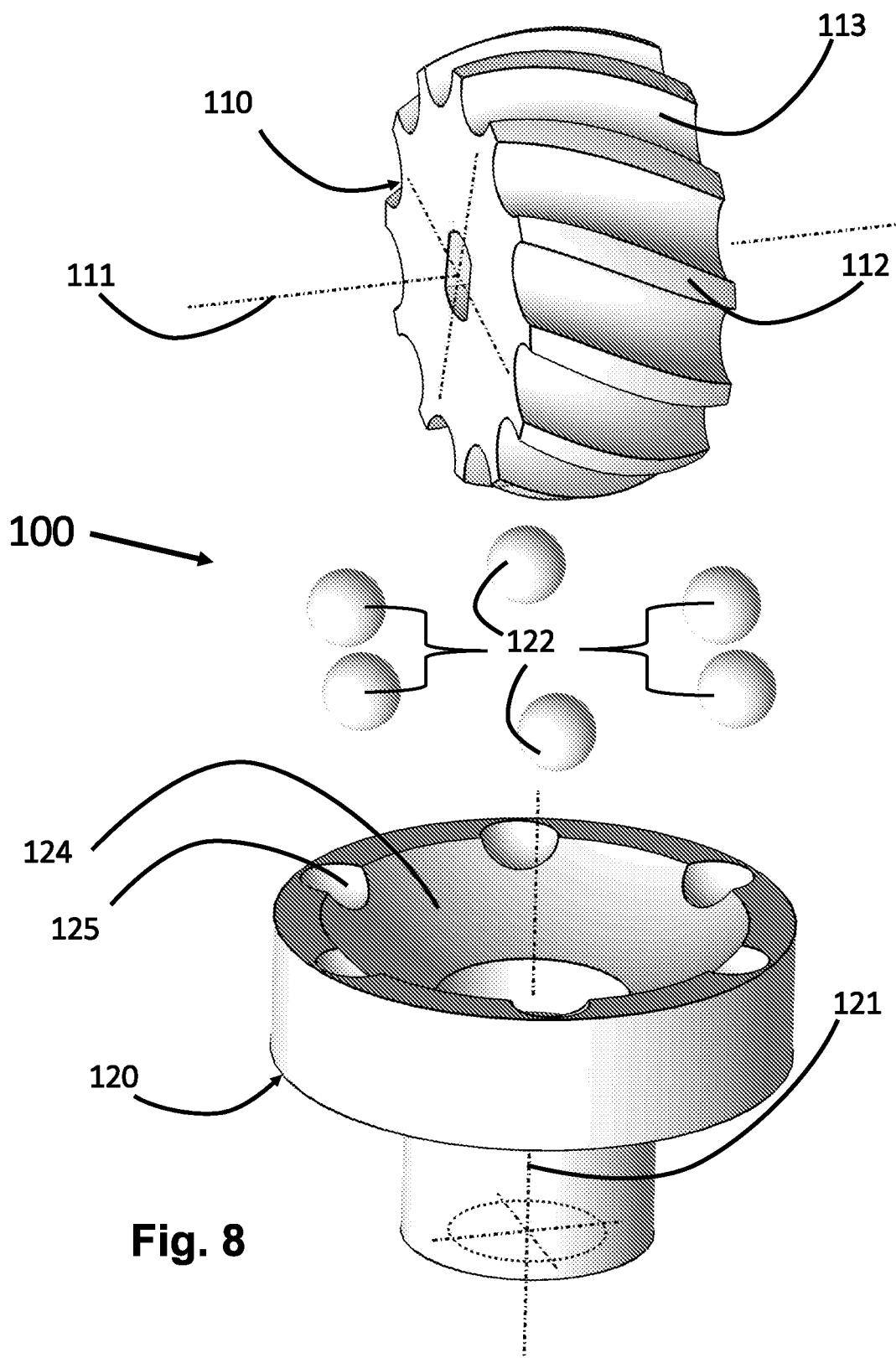
FIG. 8 shows exploded view of the second embodiment of the rotational motion transmission unit (100).

FIG. 8 shows exploded view of a second embodiment of the rotational motion transmission unit (100), wherein a driver (110) has an axis of rotation (111) and on its outer surface (112) have multiple guides (113) that curls around the driver axis (111) with an axial lead. The curling radius and pitch of the guide (113) varies throughout length. The guide (113) is made as a groove and is designed for speed multiplication. A driven (120) has an axis of rotation (121). Followers (122) of this embodiment are spherical balls that assemble with the driven (120), by fitting in pockets (125) present on a radially inner surface (124) of the driven (120). Using spherical balls as the followers (122) helps reduce friction while motion transmission.

Figure 9:
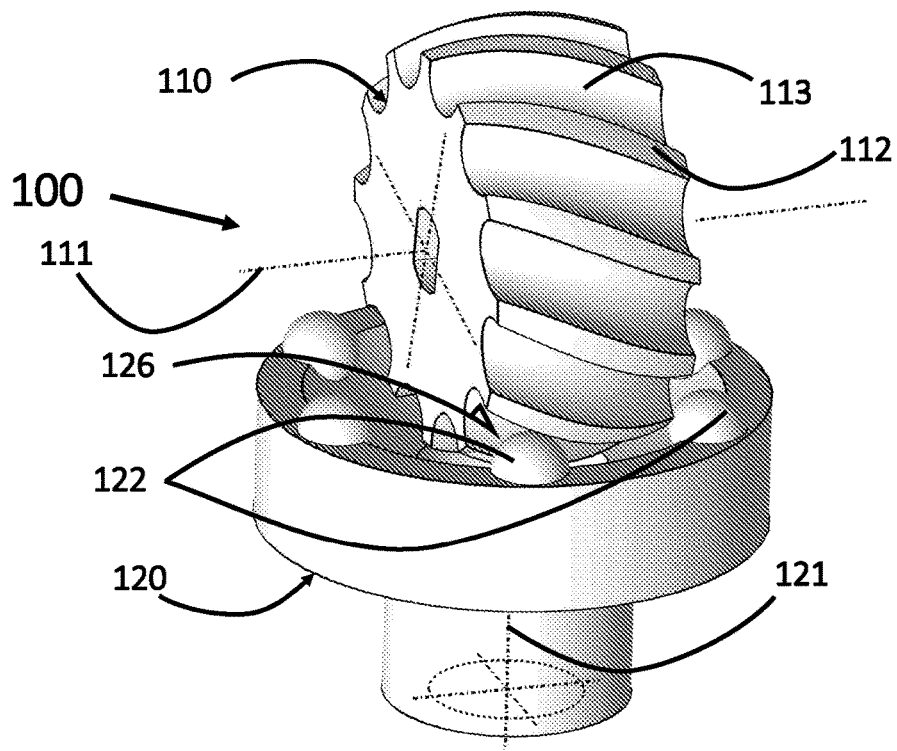
FIG. 9 shows the assembly of the second embodiment of the rotational motion transmission unit (100).

FIG. 9 shows the assembly of the second embodiment of the rotational motion transmission unit (100). The guides (113) engage with the followers (122) on one side. The followers (122) are meant to follow the guide (113) to obtain motion transmission. A contact patch (126) comprises surfaces, edges and vertices of the followers (122) that abuts with the guide (113) for transferring the motion. The contact patch (126) of the followers (122) is radially inward to the driven (120). In this embodiment the driver axis (111) and the driven axis (121) are non-intersecting and are at right angle to each other (non-parallel). The second embodiment is similar to first the only difference being the driver (110) having multiple guides (113) designed for speed multiplication and the driven (120) with the assembled followers (122). When the driver (110) is rotated around its axis (111), the guide (113) leads the engaged follower (122) in an arc resulting in rotation of the driven (120) around the axis (121).

Figure 10:
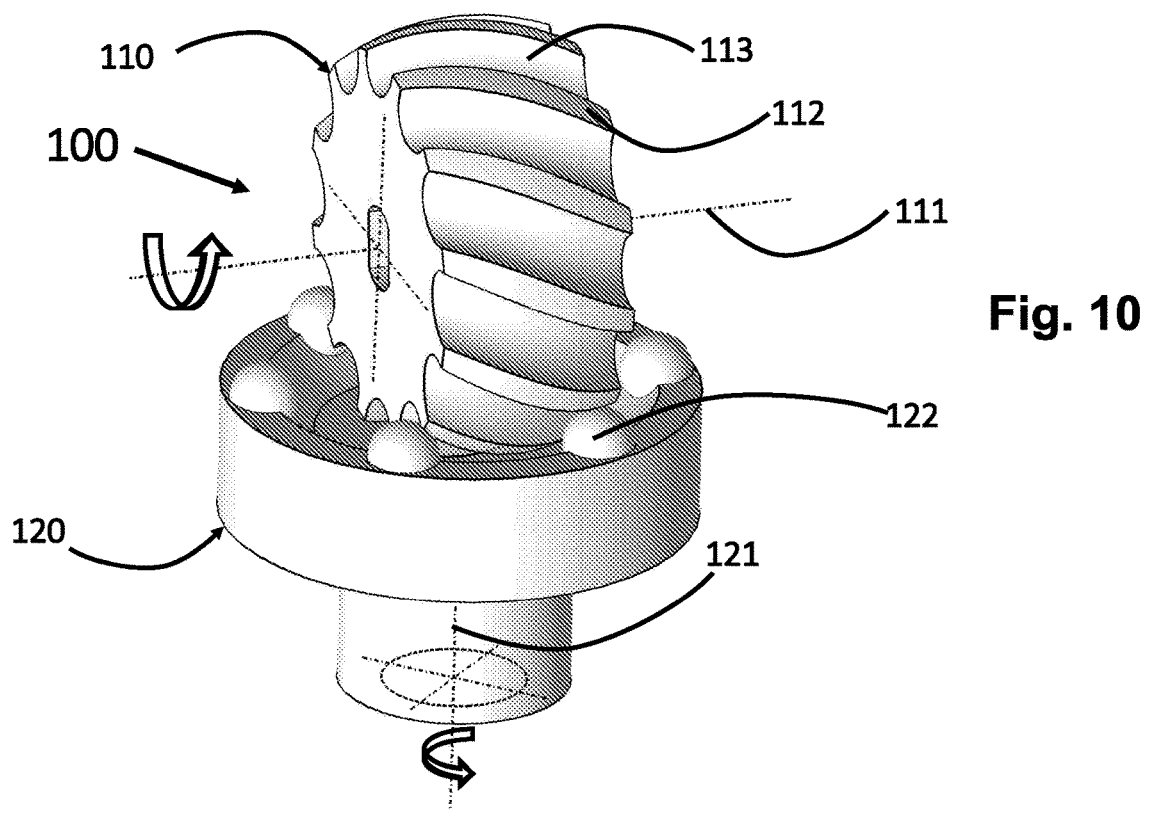
FIG. 10 shows the assembly of FIG. 9 with rotationally displaced the driven (120) when the driver (110) is rotated.

FIG. 10 shows the assembly of FIG. 9 with the rotationally displaced driven (120) when the driver (110) is rotated. After getting led in an arc the engaged follower (122) further dis-engage from the guide (113) while the next follower (122) engage with the next guide (113) and gets led in the same way. The rotational motion transmission unit of the second embodiment has a velocity ratio of 1:2, where 15-degree rotation of the driver (110) around the axis (111) results in 30-degree rotation of the driven (120) around the axis (121). When the driver (110) rotates two rotations the driven (120) rotates four rotations giving a speed ratio of 1:2. The driver (110) and the driven (120) are continuously rotatable in synchronization.

Embodiment 3

Figure 11:
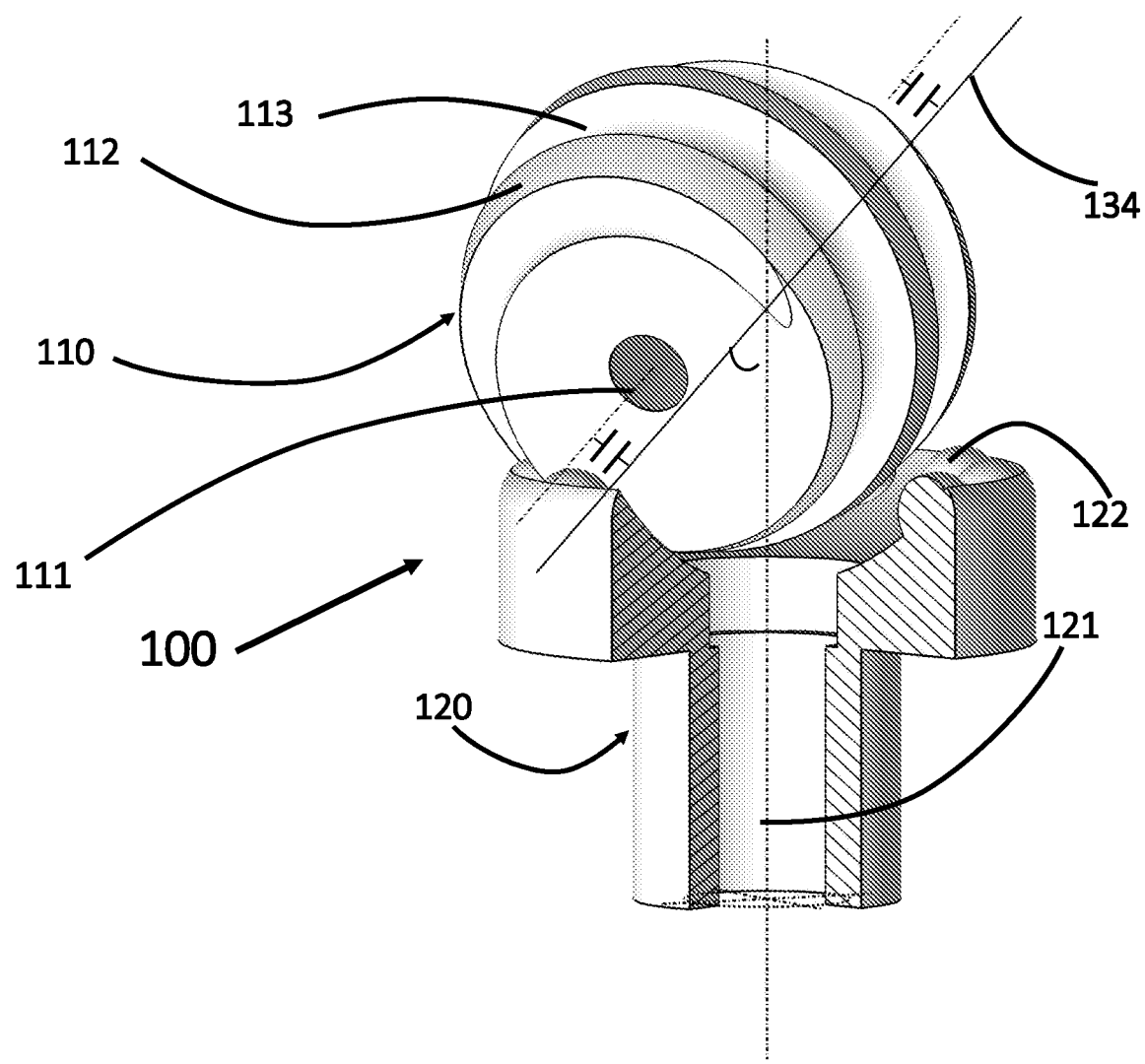
FIG. 11 shows the assembly of the third embodiment of the rotational motion transmission unit (100) with cut section of the driven (120).

FIG. 11 shows the assembly of a third embodiment of the rotational motion transmission unit (100) with cut section of a driven (120). Similar to the first embodiment, this embodiment also has a driver axis (111) and a driven axis (121) are non-intersecting, the only difference is the driver axis (111) is not at right angle to the driven axis (121). To indicate the angle of transmission a segment (134) is drawn parallel to the driver axis (111) that intersects the driven axis (121) and angle between it is indicated.

Figure 12:
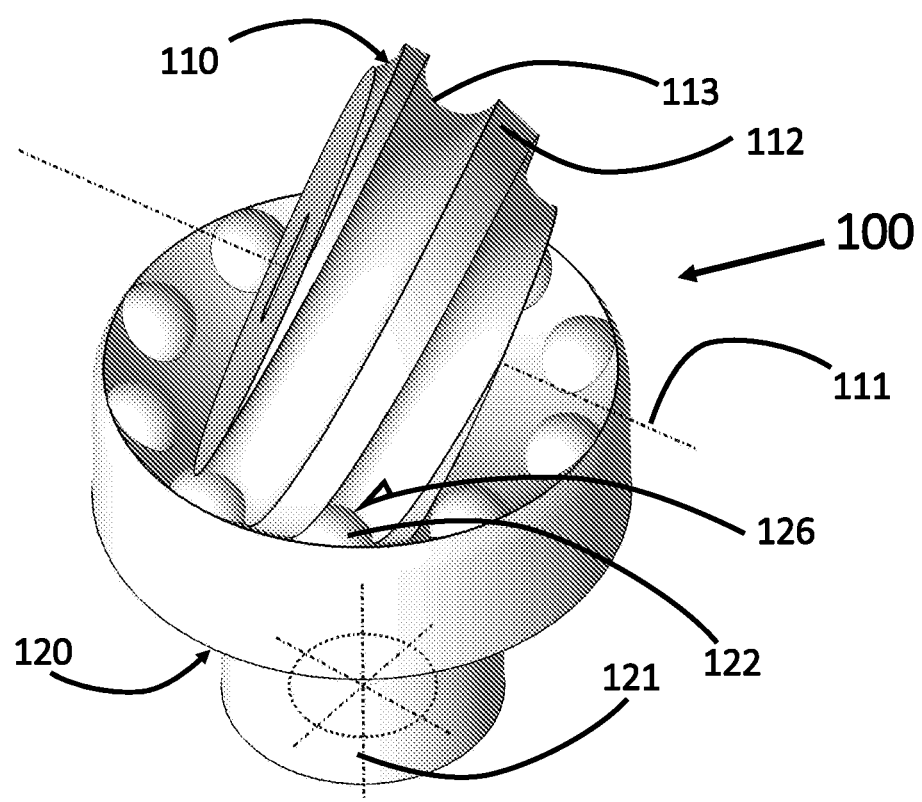
FIG. 12 shows the assembly of the third embodiment of the rotational motion transmission unit (100).

FIG. 12 shows the assembly of the third embodiment of the rotational motion transmission unit (100). A guide (113) engages with followers (122) wherein the surfaces, edges and vertices of the followers (122) that abuts with the guide (113) for transferring the motion is a contact patch (126). When the driver (110) is rotated around its axis (111), the guide (113) leads the engaged followers (122) in an arc resulting in rotation of the driven (120) around the axis (121).

Figure 13:
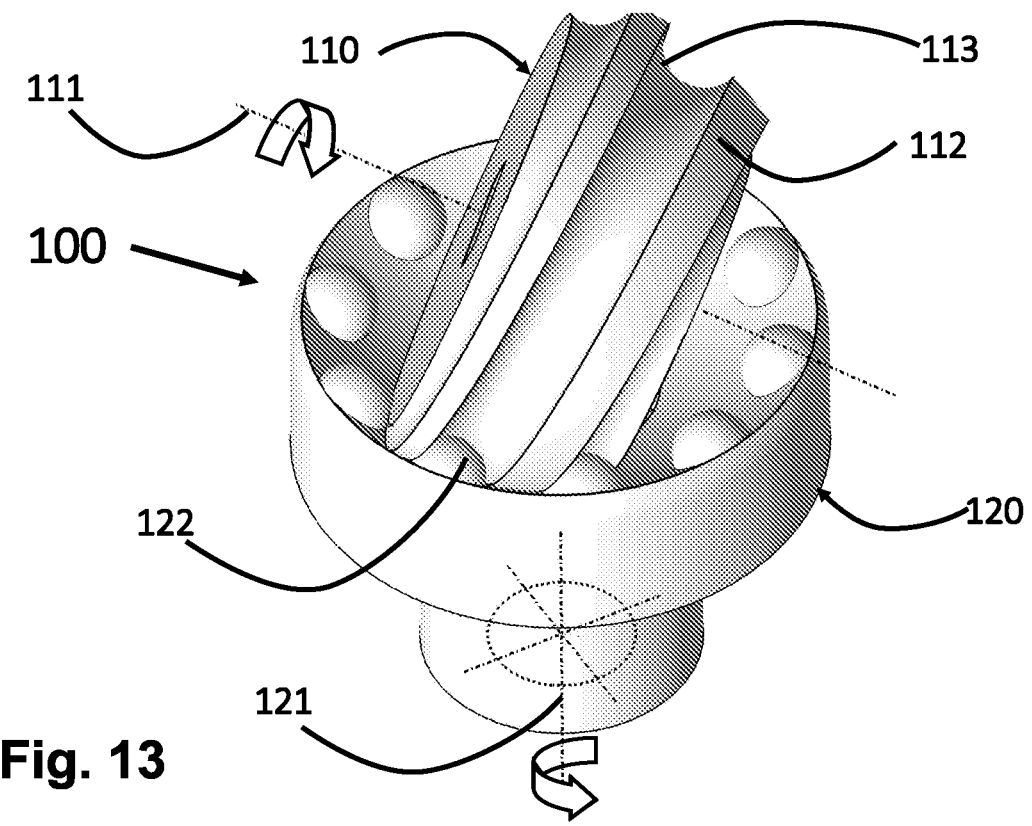
FIG. 13 shows the assembly of FIG. 12 with rotational displaced the driven (120) when the driver (110) is rotated.

FIG. 13 shows the assembly of FIG. 12 with the rotationally displaced driven (120) when the driver (110) is rotated. The engaged followers (122) after getting led in an arc further gets dis-engaged from the guide (113) while the next followers (122) engage with the guide (113) and gets led in the same way. The rotational motion transmission unit of the third embodiment has a velocity ratio of 10:1, where 200-degree rotation of the driver (110) around the axis (111) results in 20-degree rotation of the driven (120) around the axis (121). When the driver (110) rotates twenty rotations the driven (120) rotates two rotations giving a speed ratio of 10:1. The driver (110) and the driven (120) are continuously rotatable in synchronization.

Embodiment 4

Figure 14:
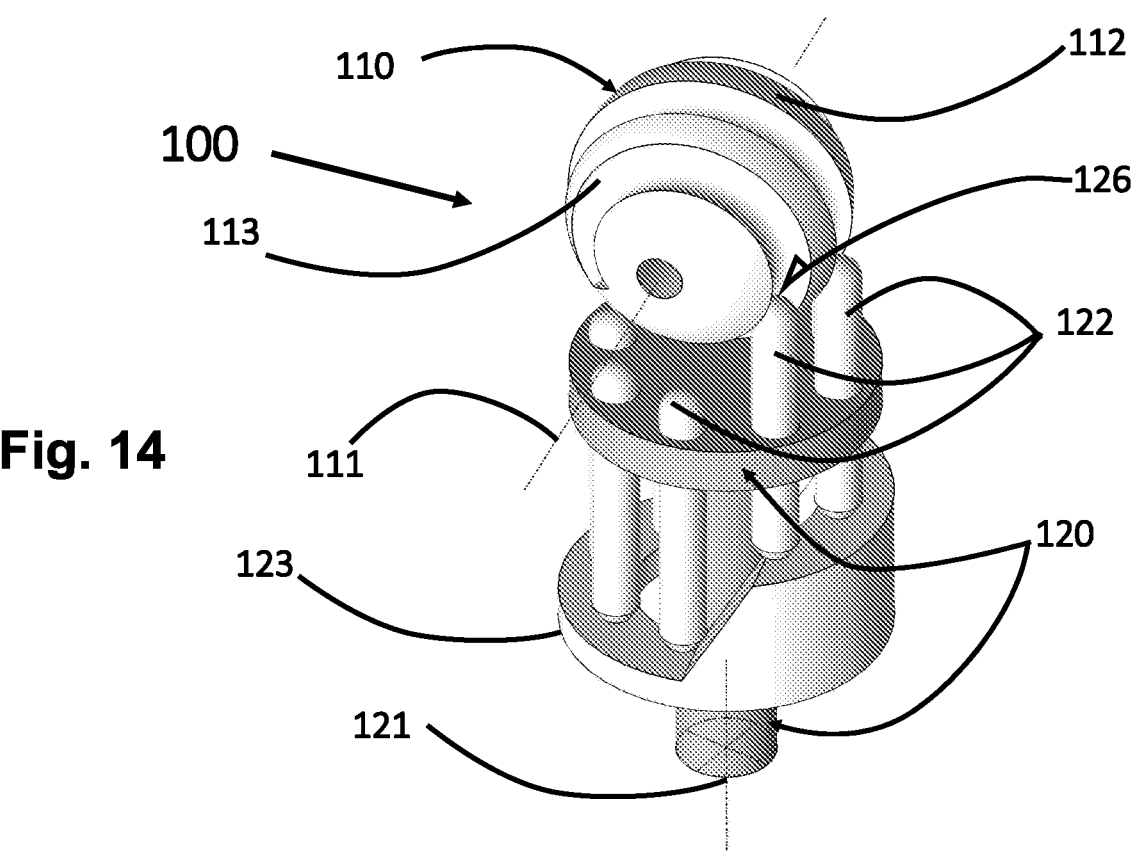
FIG. 14 shows assembly of forth embodiment of the rotational motion transmission unit (100)

FIG. 14 shows assembly of a fourth embodiment of the rotational motion transmission unit (100), where a driver (110) is spherical having a rotational axis (111) and a guide (113). A driven (120) is shaped like a disk with radially symmetric holes in which cylindrical followers (122) are assembled that can move up and down. The shape of the followers (122) in this embodiment is different but its role in working is similar as in above embodiments that is to engage with the guide (113), get led by it to make the driven (120) rotate around an axis (121). The driver axis (111) and the driven axis (121) are intersecting in this embodiment. A ramp (123) is ring shaped fixed part with incline, plateau and decline. The guide (113) engages with the followers (122) wherein the surfaces, edges and vertices of the followers (122) that abuts with the guide (113) for transferring the motion is a contact patch (126). Upon rotation of the driver (110) the guide (113) leads the engaged followers (122) in an arc which makes the driven (120) rotate around its axis (121). With that the next follower (122) climb up the ramp (123), due to the shape of the ramp (123) and engages with the guide (113) while the follower (122) after getting led by the guide (113) climb down the ramp (123) and disengage. This embodiment shows that, to disengage the followers (122) from the guide (113) a retraction system for the followers (122) can be used.

Figure 15:
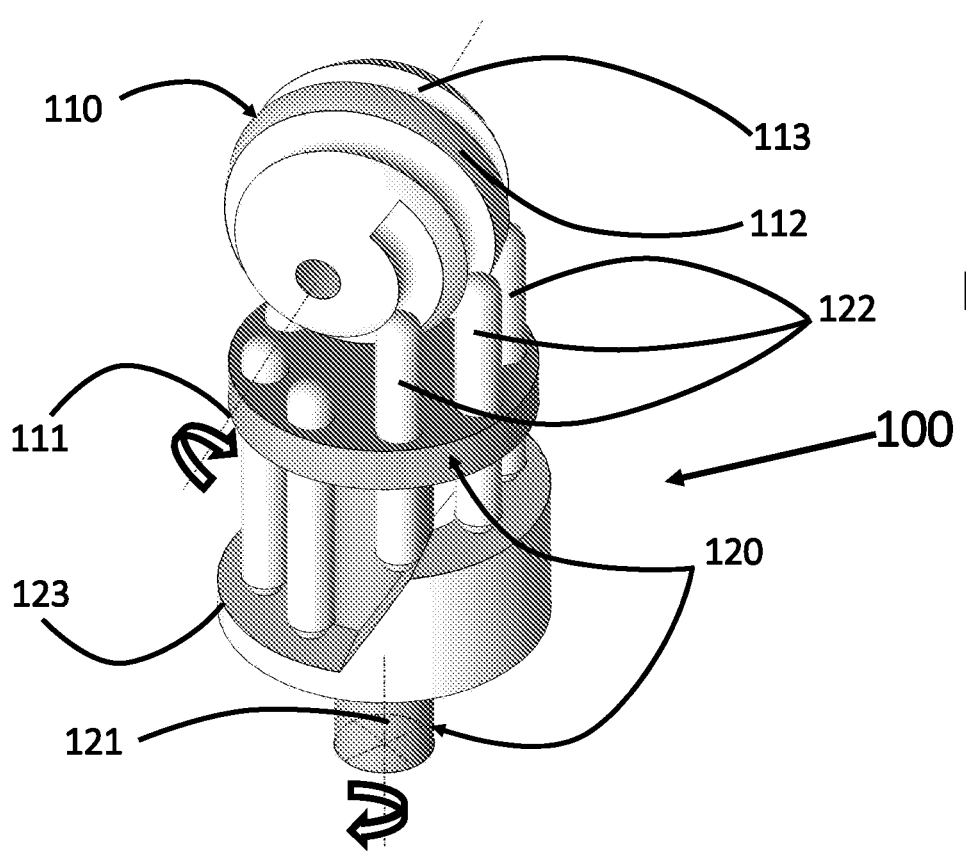
FIG. 15 shows the assembly of FIG. 14 with rotational displaced the driven (120) when the driver (110) is rotated.

FIG. 15 shows the assembly of FIG. 14 with the rotationally displaced driven (120) when the driver (110) is rotated. The rotational motion transmission unit of the fourth embodiment has a velocity ratio of 8:1, where 160-degree rotation of the driver (110) around the axis (111) results in 20-degree rotation of the driven (120) around the axis (121). When the driver (110) rotates sixteen rotations the driven (120) rotates two rotations giving a speed ratio of 8:1. The driver (110) and the driven (120) are continuously rotatable in synchronization.

Embodiment 5

Figure 16:
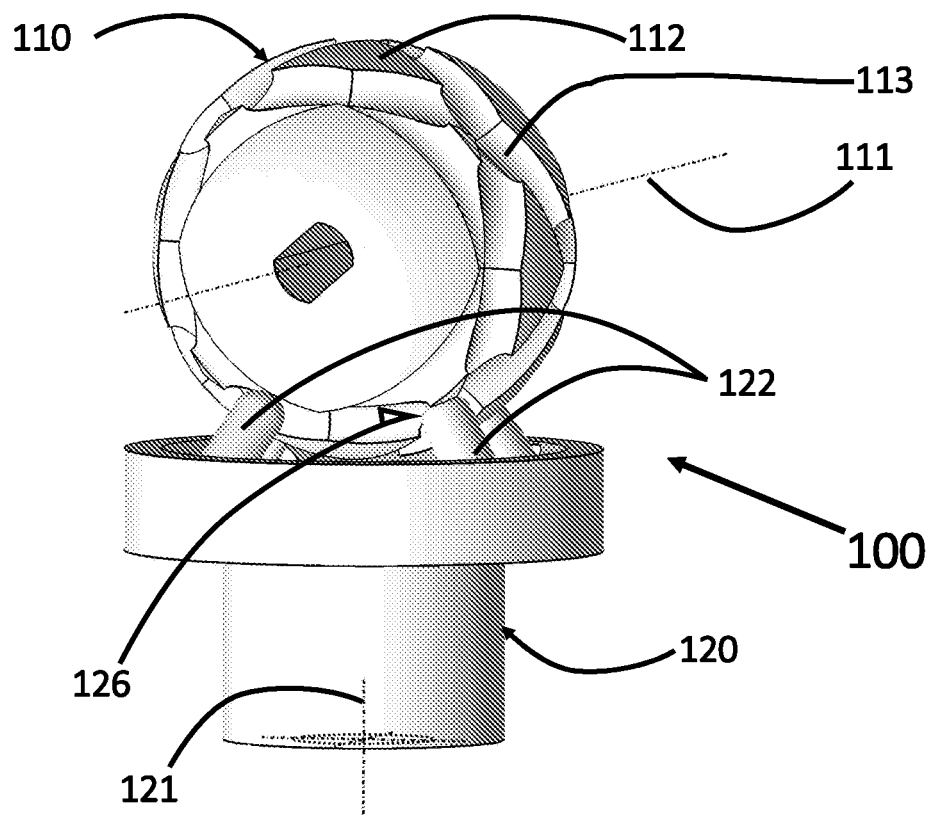
FIG. 16 shows the assembly of the fifth embodiment of the rotational motion transmission unit (100).

FIG. 16 shows the assembly of a fifth embodiment of the rotational motion transmission unit (100). A guides (113) engage with followers (122) on both sides. A driver (110) has an axis of rotation (111) and on its outer surface (112) have multiple guides (113) that curls around the driver axis (111) with axial lead. The guides (113) engaging on one side have axial lead in one axial direction, while the guides (113) engaging on other side have lead in other axial direction. The guide (113) engages with the followers (122) wherein the surfaces, edges and vertices of the followers (122) that abuts with the guide (113) for transferring the motion is a contact patch (126). When the driver (110) is rotated around the axis (111) the guides (113) engaging on either sides lead the followers (122) in axially opposite direction and in an arc, resulting in rotation of a driven (120).

Figure 17:
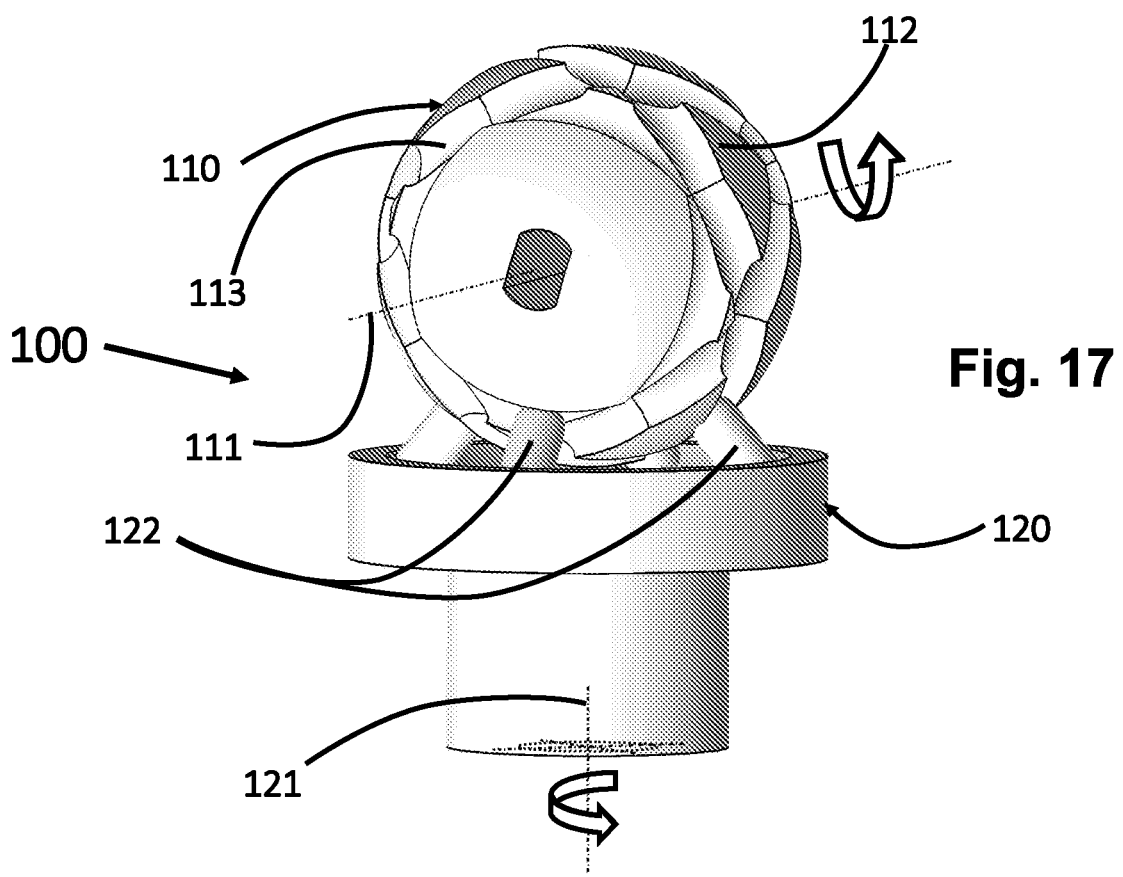
FIG. 17 shows the assembly of the FIG. 16 with rotationally displaced the driven (120) when the driver (110) is rotated.

FIG. 17 shows the assembly of the FIG. 16 with the rotationally displaced driven (120) when the driver (110) is rotated. The rotational motion transmission unit of the fifth embodiment has a velocity ratio of 1:1, where 100-degree rotation of the driver (110) around the axis (111) results in 100-degree rotation of the driven (120) around an axis (121). When the driver (110) rotates fourteen rotations the driven (120) rotates fourteen rotations giving a speed ratio of 1:1. The driver (110) and the driven (120) are continuously rotatable in synchronization.

In the forgoing description few embodiments have been disclosed. However more embodiments are possible with mix and match of different parameters and variations in size and shape, etc.

Here is how the rotational motion transmission unit/mechanism of the present invention is different from existing systems for motion transmission at angle.

Constant velocity joints, as name suggest has ratio of 1:1 only.

Gearing systems use teeth that engage with each other and works as motion transmission elements:

Bevel gear have teeth generated on the conical surface that is facing radially outward.

Hypoid gears and face gears have teeth generated on the end face.

Worm and worm-wheel and enveloping worm-wheel have teeth generated on radially outward tangential surface of worm-wheel and threads generated on tangential surface facing radially outward of worm.

The rotational motion transmission unit/mechanism of the present invention for transmitting rotational motion at angle, uses guide and followers, which has less constraints of size and shape while designing compared to teeth and threads (however teeth can also be used). The rotational motion transmission unit/mechanism has guide on driver that engages with followers of driven to transmit rotational motion, where the contact patch of followers that abuts to the guide for motion transmission is radially inward to driven which makes it different from the gearing systems mentioned above. This characteristic gives design freedom and various advantages, a few are mentioned below.

Here are few advantages offered by the mechanism of the present invention compared to existing methods for motion transmission along with speed multiplication or torque multiplication or 1:1 speed ratio between two non-parallel axes.

Compared to bevel gear set the invention is capable of offering higher speed and torque multiplication ratios in more compact size for same power and torque delivery. Also the mechanism of the present invention can have intersecting or non-intersecting driving driven axes, whereas bevel gear set has intersecting axes only.

Compared with worm and worm-wheel and enveloping worm and worm-wheel, the mechanism of the present invention has similar screw type operation to transmit motion however the mechanism of the present invention is designable for substantially less offset (compared to worm and worm-wheel and enveloping worm and worm-wheel) between non-intersecting driver and driven axes and can also be designed for intersecting axes. In worm and worm-wheel and enveloping worm and worm-wheel the worm and enveloping worm is driving part and worm-wheel is driven part. The distance between engaging surface of worm-wheel and worm-wheel axis is less than distance between worm-wheel axis and worm/enveloping worm axis. Whereas in the mechanism of the present invention, the distance between driven axis and driver axis is less than the distance between driven axis and the point on contact patch of followers (surfaces, edges and vertices of follower that abuts with guide to transmit motion) that is proximate to driven axis. Also worm and worm-wheel and enveloping worm and worm-wheel only transmit motion at right angle whereas the mechanism of the present invention is designable to transmit rotational motion at any angle (having non-parallel axes).

Compared to hypoid gears, the mechanism of the present invention is designable for lower torque multiplication ratios, 1:1 speed ratio as well as speed multiplication ratios which isn't possible with hypoid gears. Also the present mechanism is capable of transmitting higher power and torque to its size compared to hypoid gears.

The foregoing description describes five embodiments of the present invention. It should be appreciated that these embodiments are described for the purpose of illustration only, and that numerous alterations and modifications may be practiced by those skilled in the art without departing from the spirit and scope of the invention. It is intended that all such modifications and alterations be included in so far as they come within the scope of the invention as claimed or the equivalents thereof.

| No. | Denotes |
|---|---|
| 100 | Rotational motion transmission unit |
| 110 | Driver |
| 111 | Driver axis |
| 112 | Outer surface |
| 113 | Guide |
| 120 | Driven |
| 121 | Driven axis |
| 122 | Follower |
| 123 | Ramp |
| 124 | Radially inner surface |
| 125 | Pocket for follower |
| 126 | Contact patch: The contact patch refers to the surfaces, edges and vertices of followers (122) that abuts with the guide (113) for transferring the motion |
| 131 | Minimum straight between axes (111) and (121) |
| 132 | Point on follower (122) which engages (contacts) with the guide (113) and is nearest from the driven axis (121) |
| 133 | Minimum straight distance between axis (121) and point (132) |
| 134 | Segment parallel to driver axis (111) |

We claim:

1. A rotational motion transmission unit for non-parallel axes rotation, comprising:
   at least one driver, comprising:
      at least one guide, wherein the at least one guide curls around a driver axis with an axial lead, wherein a curling radius and a pitch of the at least one guide vary throughout a length of the at least one driver; and
   at least one driven comprising at least one follower arranged around a driven axis,
   wherein:
      the at least one driver, while rotating around its axis, is arranged to rotate the at least one driven around the driven axis by the at least one guide leading the at least one follower engaged with it in an arc around the driven axis,
      the at least one driver and the at least one driven are adapted to rotate continuously in synchronization;
      the at least one guide leads the at least one follower less than 180 degrees around the driven axis, and
      the guide and follower are configured to disengage and re-engage with each other;
      the driver axis of rotation is at an angle to the driven axis of rotation;
      at least one contact patch of the at least one follower engaging with the at least one guide is radially inward to the driven axis; and
   wherein a first distance between the driver axis and the driven axis is less than a second distance between the driven axis and an engaging point of the at least one guide and the at least one follower.

2. The rotational motion transmission unit as claimed in claim 1, wherein the driver axis and the driven axis are non-intersecting.

3. The rotational motion transmission unit as claimed in claim 1, wherein the at least one follower is monolithic or assembled to the at least one driven.

4. The rotational motion transmission unit as claimed in claim 1, wherein the transmission unit is configurable for speed multiplication, 1:1 speed ratio, and torque multiplication.

5. The rotational motion transmission unit as claimed in claim 1, wherein the transmission unit is reversible, wherein both the at least one driver and the at least one driven are ingrained to rotate clockwise and anticlockwise.

6. The rotational motion transmission unit as claimed in claim 1, wherein the transmission unit is configurable for back drivability.

7. The rotational motion transmission unit as claimed in claim 1, wherein the at least one follower is retractable.

* * * * *